United States Patent [19]

Ohnishi et al.

[11] Patent Number: 5,682,431
[45] Date of Patent: Oct. 28, 1997

[54] FM STEREO BROADCASTING APPARATUS AND METHOD

[75] Inventors: Makoto Ohnishi, Tokyo; Masaaki Ohta, Zushi; Ikuzi Fuzitani, Tokyo; Toshiaki Nario, Tokyo; Kazuhisa Hayeiwa, Tokyo; Yoshihiko Nasu, Tokyo, all of Japan

[73] Assignees: Hitachi Denshi Kabushiki Kaisha; Nippon Hoso Kyokai, both of Tokyo, Japan

[21] Appl. No.: 353,981

[22] Filed: Dec. 6, 1994

[30] Foreign Application Priority Data

Dec. 7, 1993 [JP] Japan ................. 5-306563

[51] Int. Cl.$^6$ ................. H04H 5/00
[52] U.S. Cl. ................. 381/7; 381/2; 381/3; 381/14
[58] Field of Search ................. 381/1, 2, 3, 4, 381/5, 6, 7, 10, 14; 375/295, 303, 332; 332/117

[56] References Cited

U.S. PATENT DOCUMENTS

| | | | |
|---|---|---|---|
| 3,881,063 | 4/1975 | Mawake et al. | 381/6 |
| 4,823,390 | 4/1989 | Wittrock . | |
| 4,893,341 | 1/1990 | Gehring | 381/7 |
| 5,027,228 | 6/1991 | Yokoyama | 369/85 |
| 5,091,705 | 2/1992 | Hiramatsu et al. | 375/303 |
| 5,220,557 | 6/1993 | Kelley | 375/295 |

FOREIGN PATENT DOCUMENTS

| | | | |
|---|---|---|---|
| 0142402 | 6/1987 | Japan | 332/117 |
| 52-18992 | 8/1993 | Japan . | |

OTHER PUBLICATIONS

"A Design Method for High-Audio-Quality FM Multiplex Encoders", A. Oliveira, 8013 AES Journal of the Audio Engineering Society, 40 (1992) Mar., No. 3, New York, US, pp. 130–141.

"Stereocoder–hausgemacht", Funkschau, No. 20, Sep. 1983, Mumchen De, pp. 81–86.

Primary Examiner—Curtis Kuntz
Assistant Examiner—Duc Nguyen
Attorney, Agent, or Firm—Antonelli, Terry, Stout & Kraus, LLP

[57] ABSTRACT

The FM stereo broadcasting apparatus has a sampling frequency converter for receiving a digital input signal having an L (left audio)-signal and an R (right audio)-signal and for converting the digital input signal so that its sampling frequency is equal to either a frequency of a subcarrier of a composite audio signal or a first sampling frequency of a first sampling signal for the operation of a composite audio signal generator, a sampling signal generator for generating the first sampling signal for the operation of the composite audio signal generator having the first sampling frequency which is equal to $2^N$ times (N is an integer of 1 or above) as high as the frequency of the subcarrier, a composite audio signal generator which is operated by the first sampling signal and which generates the composite audio signal on the basis of a pilot signal and the L-signal and R-signal of the input signal from the first frequency converter, and a frequency modulator for modulating the frequency of a carrier signal by the composite audio signal from the composite audio signal generator so as to produce a frequency-modulated signal.

16 Claims, 9 Drawing Sheets

(a) CASE IN FIG. 5

(b) CASE IN FIG. 6

(c) OUTPUT OF ANALOG BPF 8

F I G. 14
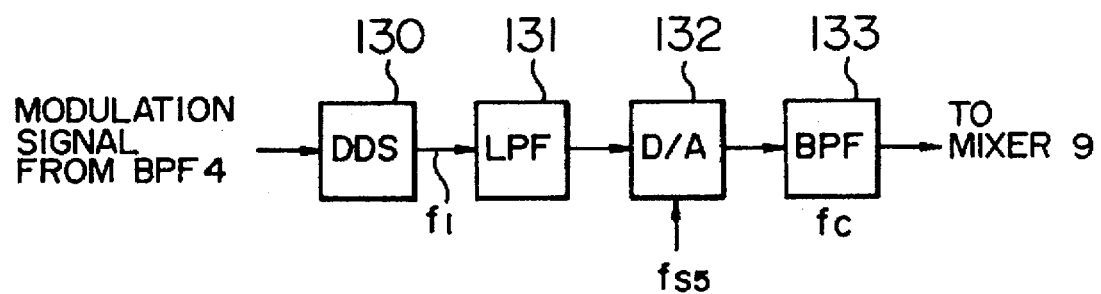
F I G. 15
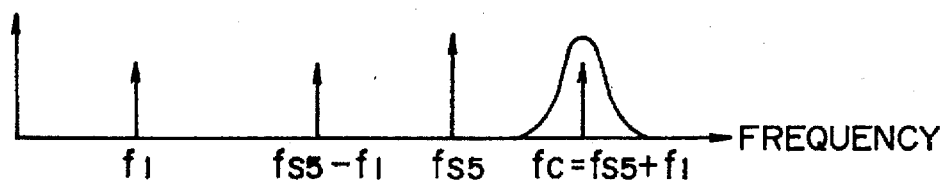

FM STEREO BROADCASTING APPARATUS AND METHOD

BACKGROUND OF THE INVENTION

This invention relates to FM communication equipment and broadcasting equipment having digital frequency-modulating circuits, and particularly to an FM stereo broadcasting apparatus which digitally processes signals and which has features of stabilized operating characteristics, small size and low power consumption.

The frequency modulation (FM) system is well known to assure high transmission quality as compared with the amplitude modulation (AM) system, and thus FM is widely used for stereo sound broadcasting, communications through radio and satellite links and so on.

This frequency modulation is to modulate the instantaneous frequency of a carrier signal by the instantaneous amplitude of a modulation signal such as an audio signal. If the carrier signal and the modulation signal are respectively represented by $y(t)=\cos(\omega_c t+\phi(t))=\cos(\Phi(t))$ and $x(t)$, the instantaneous frequency can be expressed by the following equation.

$$d\Phi(t)/dt = \omega_c + p \cdot x(t) \quad (1)$$

$\omega_c$: the angular frequency of the carrier
p: the peak frequency deviation Integrating the equation (1) will yield the instantaneous phase of the carrier as given by $$\Phi(t) = \omega_c t + \phi_0 + p \cdot \int x(t)dt \quad (2)$$

Thus, the frequency-modulated signal can be expressed by the following equation (3).

$$y(t) = \cos(\omega_c t + \phi_0 + p \cdot \int x(t)dt) \quad (3)$$

$\phi_0$: the initial phase

The frequency modulation, which has so far been performed by analog circuits, can be now carried out by digital circuits since the digital signal processing technique and IC technology have recently been developed to higher stages.

When the digital circuit technology is used for the frequency modulation, the equation (3) is expressed in a discrete form as shown by the following equation (4).

$$Y_n = \cos(n\omega_c T + \phi_0 + p \cdot \Sigma x_n) \quad (4)$$

$Y_n$, $x_n$: sampled output and input signal sequence values
T: sampling period The equation (4) can be expressed by circuit elements as shown in FIG. 1. Referring to FIG. 1, there are shown a coefficient multiplier 51, a DDS (Direct Digital Synthesizer) circuit 56, adders 52, 53, a delay element 54 and a memory ROM (read only memory) 55 which has a cosine function value stored therein.

The operation of this circuit arrangement will be described. An input signal $x_n$ is fed to the coefficient multiplier 51 where it is multiplied by a coefficient (peak frequency deviation) p. The output from the multiplier 51 is supplied to the DDS circuit 56. In the DDS circuit 56, the adder 52 adds the input signal from the coefficient multiplier 51 to the carrier's angular frequency $\omega_c$ multiplied by a sampling period T, or $\omega_c T$. The output from the adder 52 is fed to an accumulator which is formed of the adder 53 and the delay element 54, thereby being accumulated. An initial phase value $\phi_0$ is also applied to the delay element 54.

Thus, the instantaneous phase $n\omega_c T + \phi_0 + p \cdot \Sigma x_n$ of Eq. (4) is obtained at the output of the accumulator and fed to the ROM 55. Since the ROM 55 has the cosine function value of the input stored, the frequency-modulated signal $y_n$ of Eq. (4) is produced at the output of the ROM 55.

Examples for achieving the frequency modulation by use of the digital signal processing technique are described in JP-A-2-266705 and JP-A-3-60502.

A description will be made of the carrier-suppression AM-FM system which is the composite audio signal generation system for FM stereo broadcasting, employed in Japan.

In this system, as shown in FIGS. 2A and 2B, an (L+R) signal and an (L−R) signal are generated from the L (left) signal and R (right) signal of the input audio signal (FIG. 2A). The (L+R) signal is used as a main signal, and a sub-carrier signal of 38 kHz is amplitude-modulated by the (L−R) signal with the carrier suppressed to produce a subsidiary signal. These main and subsidiary signals are multiplexed with a pilot of 19 kHz (which is used for reproducing the subcarrier signal of 38 kHz on the receiver side) thus to produce a composite audio signal (FIG. 2B).

Finally, a transmission carrier is frequency-modulated by this composite audio signal and transmitted. Thus, an FM stereo broadcast can be listened to in stereophonic sound. This FM stereo broadcast can also be heard in monaural by the conventional monaural FM receiver.

In order to produce the composite audio signal by compounding the left-and right-channel audio signals and pilot signal, it is necessary to use a composite audio signal generation circuit.

FIG. 3 shows a conventional example of the composite audio signal generation circuit. Referring to FIG. 3, there are shown low-pass filters 71, 72, an adder 73, a subtracter 74, a balanced modulator 75, an adder 76, a subcarrier signal generator 77 and a ½-frequency divider 78.

The operation of this arrangement will be mentioned with reference to FIG. 3. The audio input signals L and R on two channels are limited in their bands by the low-pass filters 71 and 72, respectively. The low-pass filters 71 and 72 have a pre-emphasis function in addition to their band-limiting function. The high-frequency components of the audio signals can be pre-emphasized by these low-pass filters in order to prevent the reduction of the S/N ratio (signal-to-noise ratio) in the high-frequency regions due to the emphasis of the high-frequency components of noise upon FM modulation.

The L-and R-audio signals from the low-pass filters 71 and 72 are converted into (L+R) and (L−R) signals by a matrix circuit which is formed of the adder 73 and the subtracter 74. The (L+R) signal is fed to the adder 76, and the (L−R) signal to the balanced modulator 75 for carrier-suppression amplitude-modulation of the subcarrier 38 kHz. The balanced modulator 75 causes the subcarrier of 38 kHz from the subcarrier generator 77 to be modulated, thereby producing the subsidiary signal. The subcarrier is also fed to the ½-frequency divider 78 where its frequency is divided by 2, or the subcarrier is converted into the pilot signal of 19 kHz.

The main signal (L+R), subsidiary signal (L−R) and pilot signal are fed to the adder 76, which then produces the composite audio signal.

Examples of the composite audio signal generator are described in JP-A-1-291536 and JP-A-2-189038.

SUMMARY OF THE INVENTION

The prior art has the following problems.

Problem (1)

This composite audio signal generator becomes complicated in its circuit arrangement since the balanced modulator is formed of a multiplier, and it is expensive since complex circuits such as the balanced modulator 75 and subcarrier generator 77 are necessary.

Problem (2).

The frequency modulator which constitutes the conventional FM stereo broadcasting apparatus needs a high-precision integrator and stable voltage-controlled oscillator when the above equation (3) is embodied by analog circuits. However, it is difficult to embody it by analog circuits because high-grade circuit technology is required in order to avoid the effects of physical variations of temperature and voltage and a secular change of component elements. In addition, it is often difficult to form the composite audio signal generator by analog circuits because the matrix circuit is required to increase its precision and because the frequency characteristics of the pre-emphasis circuits must be confined to within a small deviation. Although these can be easily realized by digital circuits, the digital processing absolutely needs sampling, or a high frequency band is necessary, and hence a high carrier frequency must be handled which is difficult to treat.

Particularly when the operating sampling frequency in digital circuits becomes high, the sampling frequency for the D/A (digital to analog) converter is increased, which is used before the final frequency conversion and high-frequency power amplification. Thus, it is difficult to make a large bit number, high-precision D/A converter.

Here, the sampling frequency is the frequency at which the A/D (analog to digital) converter samples the signal or at which the D/A converter operates, and the operating sampling frequency is the sampling frequency at which the other circuits operate.

When the D/A converter is used, the sampling frequency is normally selected to be twice or more as high as the maximum frequency of a sampled signal (according to Nyquist conditions). The signals having the frequency components above ½ the sampling frequency (or Nyquist frequency) are removed as aliasing components.

In the case of D/A conversion, the signal components from 0 to the Nyquist frequency are folded to the high frequency side, and hence harmonic components appear. Thus an analog low-pass filter is necessary for eliminating the harmonic components.

Moreover, when a signal of a higher frequency than the Nyquist frequency is converted from digital to analog signal, an aliasing component appears on the low frequency side. Thus an analog band-pass filter is necessary for removing this. The band-pass filter is more difficult to construct than the low-pass filter.

Also, when the frequency of input signal is increased, the amplitude of the input signal cannot be considered to be constant within the time interval of the sampling period (the reciprocal of the sampling frequency,) and thus the signal level after sampling is decreased. Therefore, the amplitude of the analog signal after D/A conversion is decreased with the increase of the input audio signal frequency by this effect, or the so-called aperture effect. In this case, an amplifier is necessary for a gain. In addition, when the FM signal is a wide-band signal, it is necessary to compensate for the frequency characteristics. These make it more difficult to treat high-frequency signals in the D/A converter.

Problem (3).

The conversion ratio of sampling frequency between the frequency modulator and the composite audio signal generator connected thereto increases and is not just an integer. Thus the circuit necessary for conversion of sampling frequency is complicated.

Furthermore, recently, along with the digitization of audio signal processing, digital audio signals are used as input signals to the composite audio signal generator, but the ratio between the sampling frequencies of audio signals is not just an integer, thus causing a similar problem.

Accordingly, it is an object of the invention to provide an FM stereo broadcasting apparatus and method using digital signal processing by which the above problem (1) can be solved.

In order to achieve the above object, according to one aspect of the invention, there is provided an FM stereo broadcasting apparatus having a sampling frequency converter for receiving a digital input signal having an L (left audio)-signal and an R (right audio)-signal and for converting the digital input signal so that its sampling frequency ($f_{s1}$) is equal to either a frequency ($f_{sub}$) of a subcarrier of a composite audio signal or a first sampling frequency ($f_{s2}$) of a first sampling signal for the operation of a composite audio signal generator, a sampling signal generator for generating the first sampling signal for the operation of the composite audio signal generator having the first sampling frequency ($f_{s2}=2^N f_{sub}$) which is equal to $2^N$ times (N is an integer of 1 or above) as high as the frequency ($f_{sub}$) of the subcarrier, the composite audio signal generator which is operated by the first sampling signal and which generates the composite audio signal (L+R, L−R) on the basis of the pilot signal and the L-signal and R-signal of the input signal from the first frequency converter, and a frequency modulator for modulating the frequency ($f_c$) of a carrier signal by the composite audio signal from the composite audio signal generator.

Thus, when the operating sampling frequency in the composite audio generator is set to be $2^N$ times as high as the subcarrier frequency, the balanced modulator and subcarrier generator can be simplified in their construction.

According to an example of the present invention, the first sampling frequency converter converts the input signal so that its sampling frequency ($f_{s1}$) is equal to the sampling frequency ($f_{s2}$) of the first sampling signal for the operation of the composite audio signal generator, and the composite audio signal generator has an adder and a subtracter for respectively generating a sum signal (L+R) and difference signal (L−R) on the basis of the L-signal and R-signal of the input signal from the first sampling frequency converter, a polarity inverter for inverting the polarity of the difference signal (L−R) from the subtracter with a period of $1/(2^{N-1} f_{sub})$, and an adder for adding the sum signal (L+R) from the adder, the polarity-inverted difference signal (L−R) from the polarity inverter and the pilot signal to produce the composite audio signal.

Thus, since the polarity inverter can be used in place of the conventional balanced modulator using a multiplier, the composite audio signal generator can be simplified in its construction, solving the above problem (1).

According to another example of the present invention, the ratio (m) of the frequency ($f_c$) of the carrier to the sampling frequency ($f_{s5}$) of the sampling signal for the operation of the frequency modulator is selected to be ½ or more.

Thus, since the operating sampling frequency is not necessary to be so large as compared with the carrier frequency, the frequency modulator can be easily formed, and in addition the sampling frequency of the D/A converter may be low and thus can be connected to the modulator output circuit with ease, solving the above problem (2).

According to another example of the present invention, the first sampling frequency converter has a counter which is periodically reset by a sampling pulse signal of which the frequency is equal to the sampling frequency ($f_{s1}$) of the input signal and which counts a clock signal of which the period is shorter than the sampling frequency ($f_{s1}$) of the input signal or the first sampling frequency ($f_{s2}$) and produces the count each time the first sampling signal having the first sampling frequency ($f_{s2}$) is applied, and a time variant coefficient filter having a filter coefficient determined by the count from the counter and which converts the frequency of the input signal sampled by the sampling pulse signal of the sampling frequency ($f_{s1}$) into a signal sampled at the first sampling frequency ($f_{s2}$).

Thus, since the sampling frequency converter is provided between the input circuit and the composite audio signal generator, the input circuit and the generator can be connected with ease. If the same sampling frequency converter is provided between the composite audio generator and the frequency modulator, the generator and the modulator can be easily connected. In addition, this sampling frequency converter can make non-integer multiple frequency conversion. Therefore, the above problem (3) can be solved.

According to another aspect of the present invention, there is provided a frequency modulator for modulating the frequency ($f_1$) of a carrier by a sampled modulation signal, this modulator having a frequency modulator circuit which is operated at the first sampling frequency ($f_{s5}$) and modulates the frequency of the carrier by the input modulation signal to produce the frequency-modulated signal, a digital-to-analog converter for converting the frequency-modulated signal into an analog signal to produce an aliasing frequency component of $nf_{s5} \pm f_1$ (n is a positive integer) together with the frequency component of $f_1$, and a band-pass filter of which the pass band has a center frequency $f_c$ of either $f_c = nf_{s5} + f_1$ or $f_c = nf_{s5} - f_1$, and which extracts a desired frequency component of the analog signal from the digital-to-analog converter.

Thus, any one of the aliasing frequency components of frequency $nf_{s5} \pm f_1$ can be obtained as a frequency-modulated signal.

BRIEF DESCRIPTION OF THE DRAWINGS

FIG. 14 is a block diagram of the frequency modulator in another embodiment of the FM stereo broadcasting apparatus of the invention; and FIG. 15 is a signal spectrum diagram to which reference is made in explaining the operation of the frequency modulator of FIG. 14.

DESCRIPTION OF THE PREFERRED EMBODIMENTS

Figure 1:
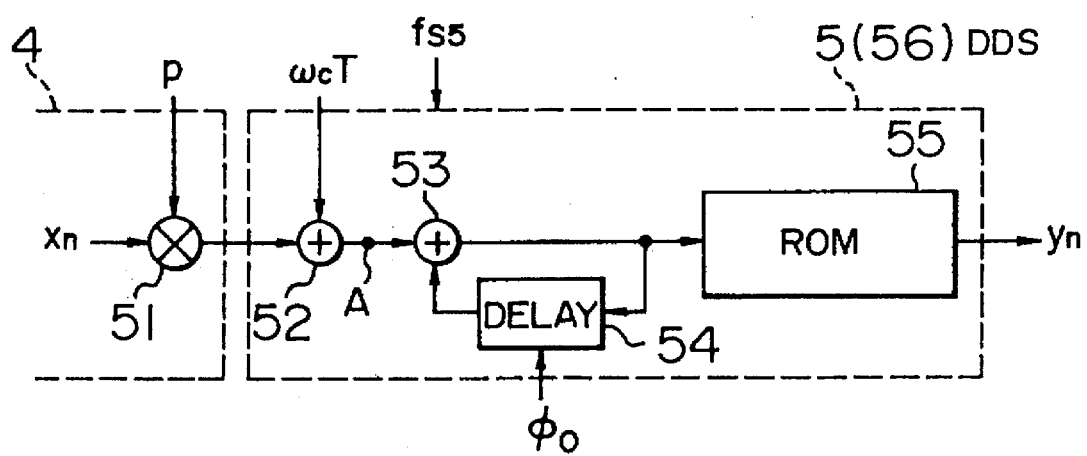
FIG. 1 is a block diagram of the frequency modulator in FM stereo broadcasting apparatus.
Figure 2A:
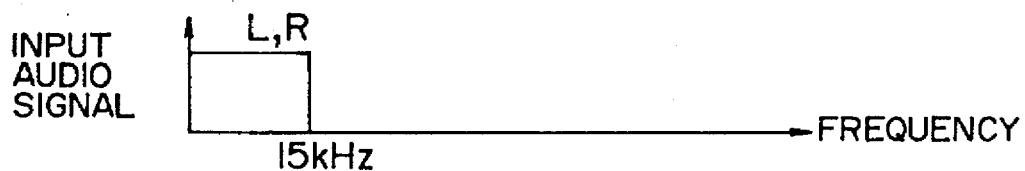
FIGS. 2A and 2B show the input audio signal and composite audio signal used in FM stereo broadcasting.
Figure 2B:
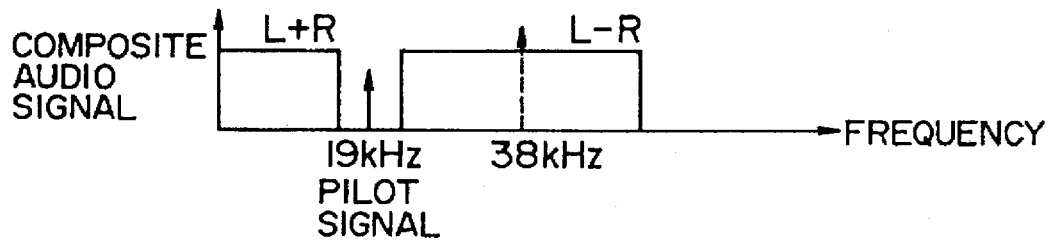

One embodiment of the FM stereo broadcasting apparatus and method of the invention will be described with reference to the accompanying drawings. In the figures, like elements are identified by the same reference numerals and will not be described.

Figure 4:
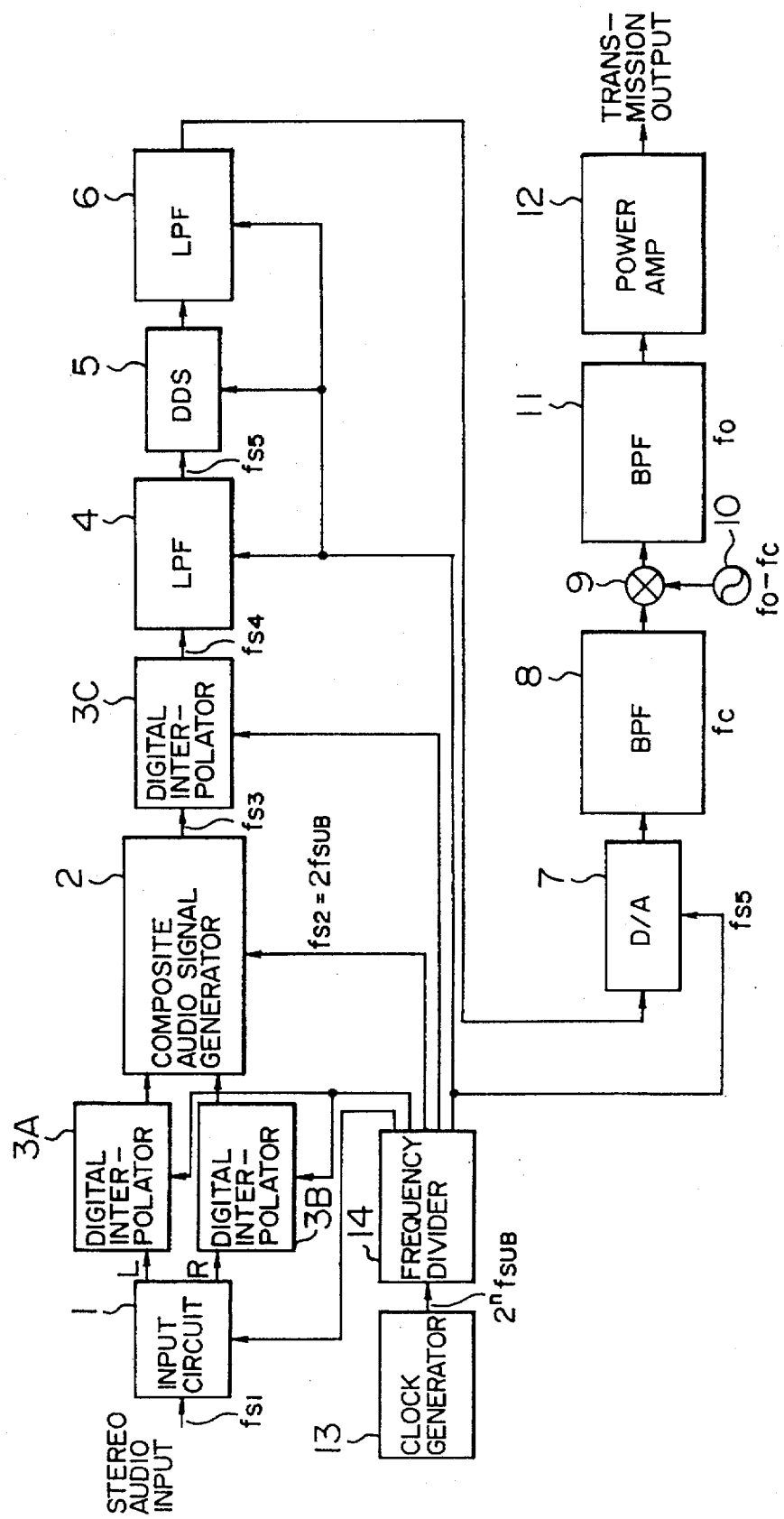
FIG. 4 is a block diagram of one embodiment of the FM stereo broadcasting apparatus of the invention.

FIG. 4 is a block diagram of one embodiment of the FM stereo broadcasting apparatus of the invention. This apparatus has an input circuit 1 to which a stereo digital audio signal is applied, a digital composite audio signal generator 2 to which separated L-and R-audio signals are applied, digital interpolators 3A, 3B and 3C for converting sampling frequencies into other frequencies, a low-pass filter 4, a DDS (Direct Digital Synthesizer) circuit 5 serving as a frequency modulator, a low-pass filter 6, a D/A converter 7, an analog band-pass filter 8, a frequency mixer 9, a local oscillator 10, an analog band-pass filter 11 and a high-frequency power amplifier 12.

The digital interpolator 3C of the digital interpolators 3A, 3B and 3C may be omitted, as will be described later.

In FIG. 4, $f_{s1}$, $f_{s3}$, $f_{s4}$ and $f_{s5}$ indicate sampling frequencies of signals. Reference character $f_{s2}$ represents the operating sampling frequency of the composite audio signal generator 2, and $f_{s5}$ the operating sampling frequency of the D/A converter 7.

A clock signal generator 13 shown in FIG. 4 generates a clock signal of $2^n f_{sub}$ (n=8 in this embodiment). A frequency divider 14 shown in FIG. 4 divides the clock signal from the clock signal generator 13 by 2, 4 and 8 to produce frequency-divided signals which are then fed to the composite audio signal generator 2, digital interpolators 3A, 3B, 3C, low-pass filter 4, DDS circuit 5 and D/A converter 7. In other words, for example, a divided-by-4 signal, or a clock signal of $2f_{sub}$ is supplied to the composite audio signal generator 2.

The fundamental idea of the invention will be first mentioned before the description of the embodiment of the FM stereo broadcasting method and apparatus of the invention.

(1) In the composite audio signal generator 2, it is preferable that the operating sampling frequency be selected to be $2^N$ (N is an integer of 1 or above) times as high as the subcarrier frequency of 38 kHz. In addition, harmonics due to the sampling for digital signals are used in order to simplify the circuit arrangements of the balanced modulator, subcarrier generator and so on. Thus the above problem (1) can be solved.

(2) In the frequency modulator 5, the value of $\omega_c T$ ($=2\pi f_c/f_s=2\pi m$, or times as large as the ratio (m) between the carrier frequency and the operating sampling frequency) is fixed to be larger than $2\pi \cdot (\frac{1}{2})$ (or $m \geq \frac{1}{2}$).

Under these conditions, the operating sampling frequency does not need to be so large as compared with the carrier frequency. Thus the frequency modulator can be easily constructed, and the sampling frequency of the D/A converter may be low and hence can be connected to the modulation output circuit with ease.

The condition of $\omega_c T \geq 0.5 \cdot (2\pi)$ seems to contradict with the D/A converter mentioned at the problem (2), but the problem (2) can be solved by setting the carrier frequency of the FM signal to be high and making the FM signal be a narrow-band signal.

The FM broadcasting wave has a frequency shift of 75 kHz, and hence the frequency bandwidth of the modulated wave is about 150 kHz. If the carrier frequency is 10 MHz, the fractional band width of the FM signal is 1.5%. If the fractional band width is within 5%, the gain deviation within the pass band is also small and thus the low-pass filter 6 (or high-pass filter) is not necessary. It is quite easy to construct the analog band-pass filter 8 and make the aperture correction. Thus the problem (2) can be solved.

Since the operating sampling frequency may be small as compared with the carrier frequency under the condition of $m \geq \frac{1}{2}$ as described above, the frequency modulator can be easily constructed and also easily connected to the modulation output circuit.

(3) Moreover, the sampling frequency is digitally changed at least at either the connection point between the input circuit 1 to which the digital audio input signal is supplied and the composite audio signal generator 2 or the connection point between the composite audio signal generator 2 and the frequency modulator 5, thereby making the connection therebetween easy. Thus the above problem (3) can be solved.

The principle of operation for each of the above features (1)–(3) of the invention will be described below.

Figure 5:
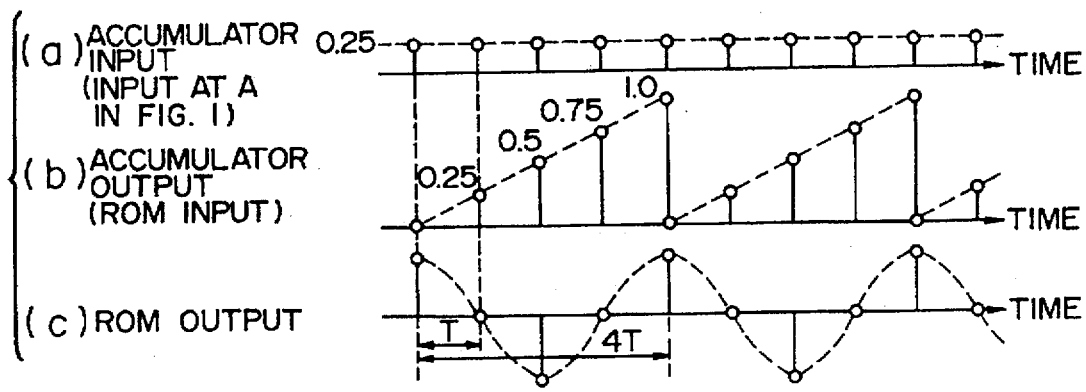
FIG. 5 is a timing chart to which reference is made in explaining the operation of the frequency modulator of $\omega_c T = 0.25$ in the FM stereo broadcasting apparatus of the invention.

First, the feature (2) will be mentioned. FIG. 5 is a waveform diagram for $\omega_c T=0.25 \cdot (2\pi)$ (or m=0.25) selected in the frequency modulator. Hereinafter, constant $2\pi$ will be omitted.

A constant value of 0.25 as in (a) of FIG. 5 is added at the input (point A) to the accumulator 53, 54 of the frequency modulator 5 shown in FIG. 1. The accumulator integrates the successive values to produce a slope of gradient 0.25 since it increases by 0.25 every period T, but it overflows, or is reset at 1. Thus the output from the accumulator is a sawtooth waveform of which the period is 4T of 0, 0.25, 0.5, 0.75, 1(0), . . . as shown in (b) of FIG. 5.

The construction of the frequency modulator 5 in the FM stereo broadcasting apparatus of the invention is the same as in FIG. 1.

The frequency modulator 5 (DDS circuit 56) is operated at the operating sampling frequency $f_{s5}$. Thus, the adder 52 adds the composite audio signal sampled at the sampling frequency $f_{s5}$ from the LPF 4 to the signal $\omega_c T$ of a constant value which is equal to the ratio $m=f_c/f_{s5}$ between the frequency $f_c$ of the carrier to the sampling frequency $f_{s5}$ of the sampling signal for the operation of the frequency modulator. Then, the accumulator formed of the adder 53 and the delay element 54 integrates (accumulates) the added value from the adder 52. The ROM 55 makes either the sine function or cosine function thereof to produce a frequency-modulated signal. The initial phase value $\phi_0$ applied to the delay element 54 is for example 0.

Since the output from the accumulator is fed to the input of the ROM, 55, the output from the ROM which has sine wave data previously stored therein is a sine wave of period 4T as shown in (c) of FIG. 5. This sine waveform has a frequency of $\frac{1}{4}=f_s/4$. Thus it will be understood that the constant $\omega_c T$ fed to the accumulator gives the ratio between the sine wave frequency and the sampling frequency.

Figure 6:
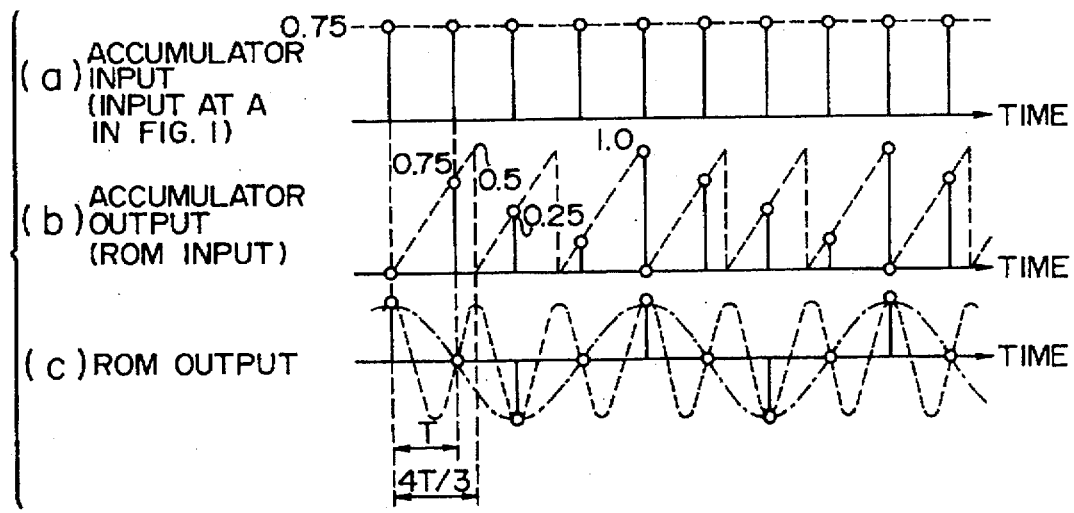
FIG. 6 is a timing chart to which reference is made in explaining the operation of the frequency modulator of $\omega_c T = 0.75$ in the FM stereo broadcasting apparatus of the invention.

FIG. 6 shows the operation for constant $\omega_c T=0.75$. In this case, the output from the accumulator is a sawtooth wave of gradient 0.75 of which the period is 4T/3 as shown by the dotted line in (b) of FIG. 6. The output from the ROM 55 has a sine wave form of which the frequency is $0.75 \cdot f_s$ as shown in (c) of FIG. 6.

By the way, an aliasing phenomenon is caused by the sampled signal in digital processing. If the constant $\omega_c T$ is selected to be larger than ½, the frequency of the output sine wave becomes higher than the Nyquist frequency $f_s/2$, but an aliasing component appears on the low frequency side. In the case of a single sine wave, the original signal cannot be distinguished from the aliasing component. The signal (the ROM output indicated by the one-dot chain line in (c) of FIG. 6) resulting from sampling at $f_s$ the output sine wave of $0.75 f_s$ shown in (c) of FIG. 6 is just the same as the ROM output waveform shown in (c) of FIG. 5.

Since this aliasing phenomenon occurs even in the case of FIG. 5, the original signal cannot be distinguished from the aliasing component even if the constant $\omega_c T$ is changed. However, when the original signal is not a single sine wave, it can be distinguished.

Figure 7:
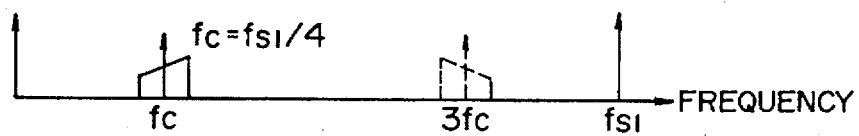
FIG. 7 is a waveform spectrum diagram to which reference is made in explaining the operation of the frequency modulator of the embodiment of the FM stereo broadcasting apparatus of the invention.
Figure 7:
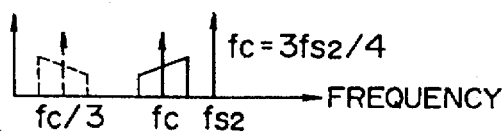
Figure 7:
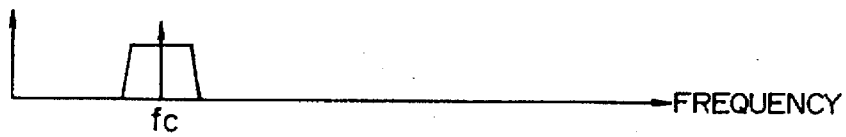

The reason for this will be mentioned with reference to the spectrum diagram of FIG. 7. It is now assumed that $f_c$ is the center frequency (carrier frequency) of the output from the ROM 55. When $\omega_c T=0.25$ as shown in (a) of FIG. 7, the operating sampling frequency $f_{s1}$ is $4f_c$, and the aliasing signal appears at $f_{s1}-f_c=3f_c$. Although the ROM output of a single sine wave (non-modulated wave) cannot be discriminated from the aliasing signal, the ROM output of a modulated wave indicated by the solid line (at around the frequency $f_c$) can be distinguished from the aliasing signal $3 f_c$ because the modulation component, or the frequency spectrum (around the frequency $3 f_c$) of the aliasing signal $3f_c$ shown by the dotted line, is the inverse of that of the signal $f_c$ with respect to frequency.

Similarly, in the case $\omega_c T=0.75$ shown in (b) of FIG. 7, the sampling frequency $f_{s2}$ is $4f_c/3$, and the frequency spectrum of the aliasing component at frequency $f_c/3$ is opposite to that of the signal $f_c$. In either case, after the digital signal is converted into an analog signal by the D/A converter (D/A converter 7 in FIG. 4) the analog band-pass filter (BPF 8 in FIG. 4) can be used to extract only the correct frequency-modulated signal of center frequency $f_c$ as shown in (c) of FIG. 7.

Here, the operating sampling frequencies in (a) and (b) of FIG. 7 will be compared. The operating sampling frequency $f_{s1}$ for $\omega_c T=0.25$ is $4f_c$, while the operating sampling frequency $f_{s2}$ for $\omega_c T=0.75$ is $4f_c/3$. Thus the operating sampling frequency for $\omega_c T=0.75$ is ⅓ as low as that for $\omega_c T=0.25$.

Since the reduction of the operating sampling frequency in digital circuits has the effect to reduce not only the operating speed and power consumption of the digital circuits but also the sampling frequency of the D/A converter, the frequency converter can be constructed with ease.

Figure 3:
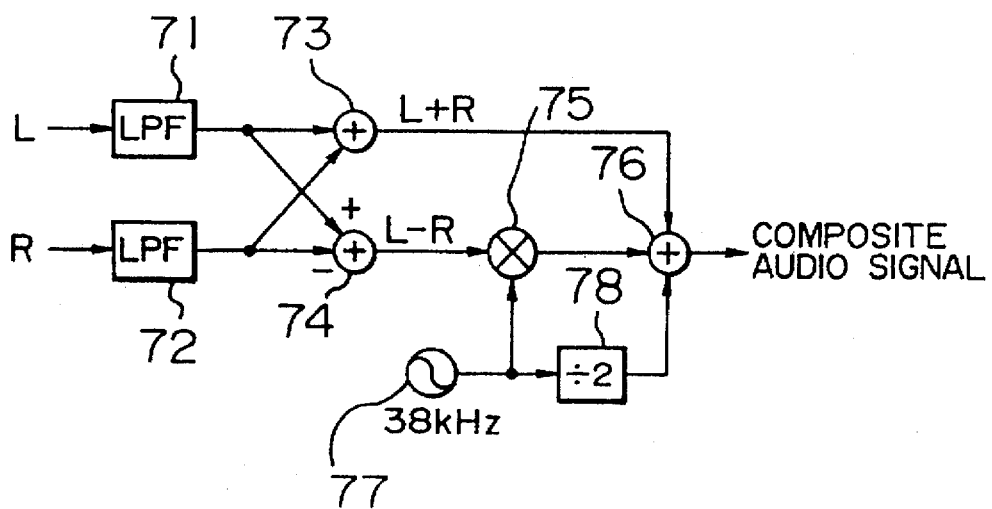
FIG. 3 is a block diagram of a conventional composite audio signal generator.

A description will be made of the feature (1), or how the construction of the composite audio signal generator 2 of the FM stereo broadcasting apparatus is simplified by digital signal processing. The balanced modulator 75 and subcarrier generator 77 in FIG. 3 are simplified in their constructions by use of harmonics which are produced by sampling for digital signal.

Figure 8:
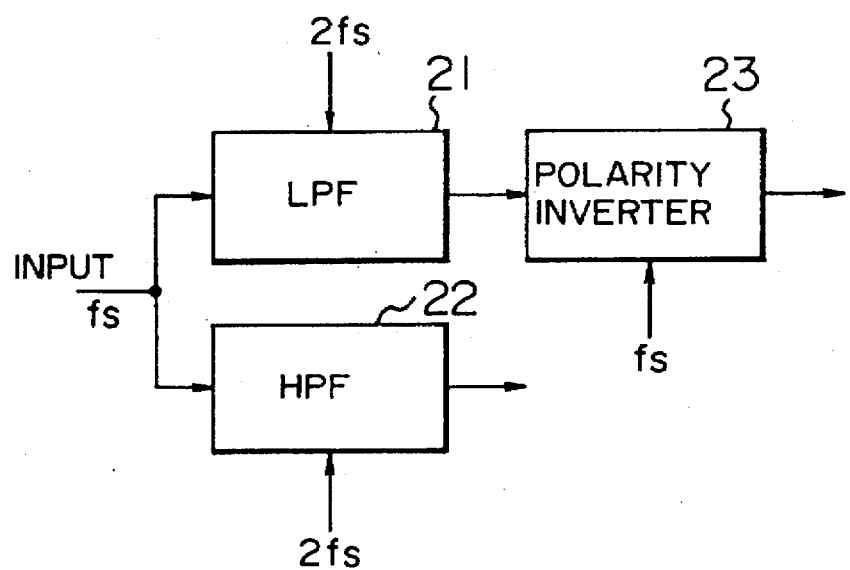
FIG. 8 is a circuit block diagram to which reference is made in explaining the principle of the balanced modulator in the embodiment of the FM stereo broadcasting apparatus of the invention.

The balanced modulator in this invention will be described in brief with reference to FIG. 8. In FIG. 8, there are shown a digital low-pass filter 21, a digital high-pass filter 22 and a polarity inverter 23.

The operating sampling frequency of digital filters 21, 22 is $2f_s$, and the polarity inverter 23 acts to invert the polarity of a signal into positive or negative at every sample (at the operating sampling frequency $f_s$).

Figure 9:
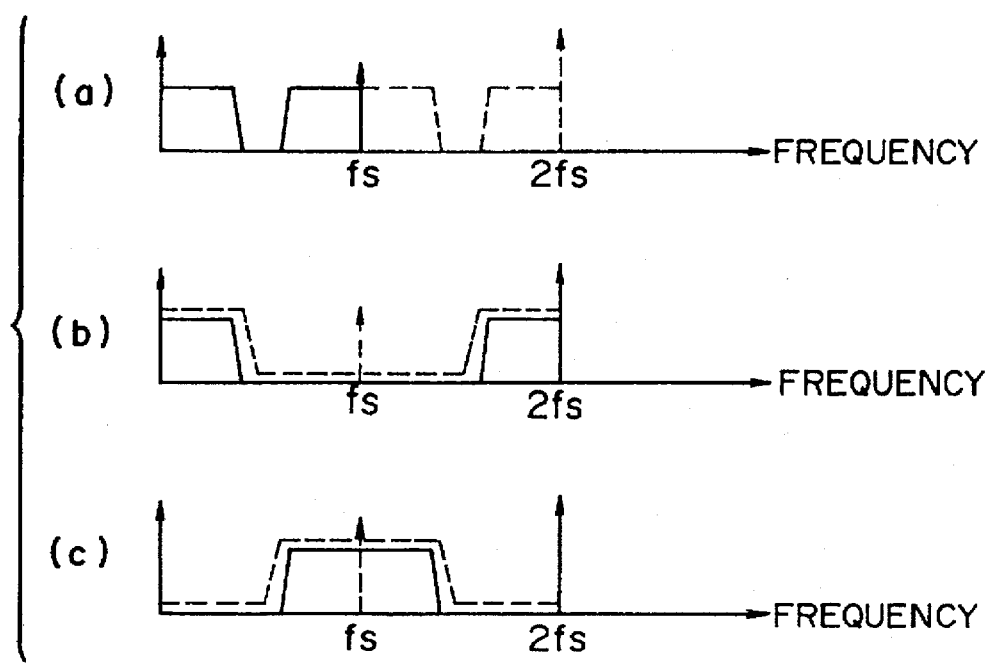
FIG. 9 is a waveform spectrum diagram to which reference is made in explaining the operation of the balanced modulator of FIG. 8.

The operation of the balanced modulator to which a signal of sampling frequency $f_s$ is applied as shown in FIG. 8, will be mentioned with reference to the operating spectrum diagram of FIG. 9. The signal of sampling frequency $f_s$ has a spectrum frequency component of 0 (DC) to $f_s/2$ folded at $f_s/2$ (called Nyquist frequency) as shown in (a) of FIG. 9.

When the signal of sampling frequency $f_s$ is supplied to a digital signal processor of operating sampling frequency $2f_s$ as shown in FIG. 8, the component 0 to $f_s$ of the signal spectrum repeatedly appears in a range from $f_s$ to $2f_s$. Thus, when the signal of sampling is supplied to the low-pass filter 21 and high-pass filter 22 of which the operating sampling frequency is $2f_s$ (their frequency characteristics are indicated by the dotted lines in (b) and (c) of FIG. 9), the outputs from the filters 21 and 22 have the spectra as indicated by the solid lines in (b) and (c) of FIG. 9. In other words, a signal resulting from resampling the input signal at a frequency of $2f_s$ is produced from the low-pass filter, and a signal of which the spectrum is the same as that of a signal resulting from modulating the input signal on the carrier signal of $f_s$ in balanced way is produced from the high-pass filter.

That is, if the sampling frequency $f_s$ of the input signal is selected to be the same as the subcarrier frequency $f_{sub}$ of the composite audio signal and to be ½ the operating sampling frequency, $2f_s$ of the signal processing circuits, the (carrier-suppression) balanced modulation can be made by processing the input signal in the high-pass filter and taking out the harmonic component.

In addition, the output signal from the low-pass filter 21 is fed to the polarity inverter 23. The polarity inverter 23 inverts the polarity of the signal of sampling frequency $2f_s$ from the filter 21 at intervals of period $1/f_s$ into positive or negative. In other words, the input signal is multiplied by +1 and −1 alternately (or multiplied by +1, −1, +1, −1, . . .) with the period of $1/f_s$. This operation corresponds to the multiplication between the output signal from filter 21 and the following equation (5).

$$\cos(2\pi n f_s T) = \cos(2\pi n f_s T / 2 f_s) = \cos(\pi n) = 1, -1, +1, -1, \quad (5)$$

$T = \frac{1}{2}f_s$: the operating sampling period
n: positive integer 0, 1, 2, . . .

That is, the polarity inversion is equal to the multiplication of the output from the low-pass filter 21 by the cosine wave of frequency $f_s$, thus still achieving balanced modulation.

Therefore, the output from the polarity inverter 23 is the same as in FIG. 9(c), or obtained by shifting the input signal by frequency $f_s$.

Thus, the polarity inverter 23 inverts the input signal with a period of frequency $f_s$ and has both functions of balanced modulator 75 and subcarrier signal generator 77 shown in FIG. 3 so that the construction of the conventional composite audio signal generator can be simplified.

While the operating sampling frequency is $2f_s$ as mentioned above, it may be $2^2$ times, $2^3$ times . . . as high as $f_s$, or $2^N$ (N is an integer of 1 or above) times as high as $f_s$.

As described above, if the sampling frequency $f_s$ of the input signal to the composite audio signal generator 2 is set to be equal to the subcarrier frequency $f_{sub}$, or $2^N$ times as high as the subcarrier frequency $f_{sub}$, or $2^N f_{sub}$ (the operating sample frequency of the composite audio signal generator), it is possible to achieve the balanced modulation by quite a simple signal processing operation.

Figure 10:
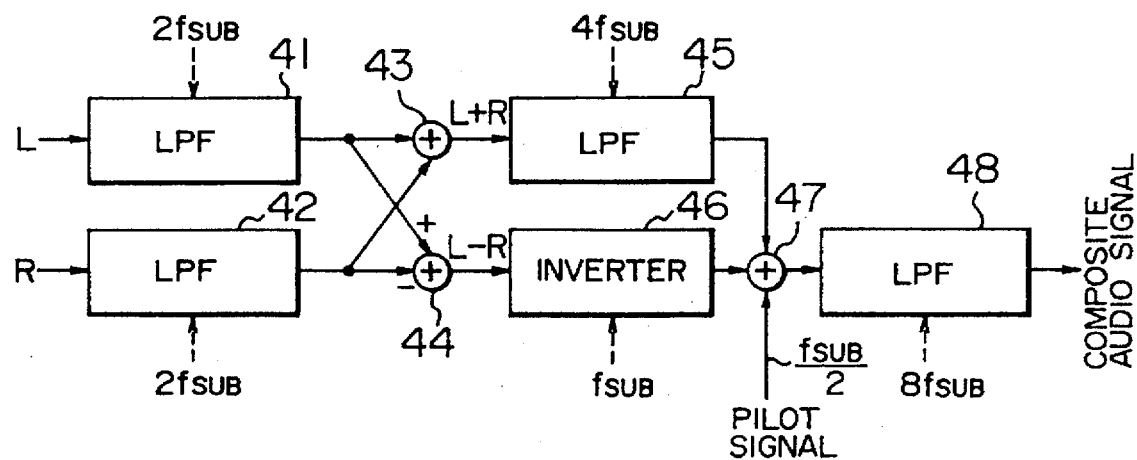
FIG. 10 is a block diagram of the composite audio signal generator in the embodiment of the FM stereo broadcasting apparatus of the invention.

FIG. 10 is a block diagram of an example of the composite audio signal generator having the polarity inverter. This arrangement will be mentioned later.

The feature (3) will be described below.

When the input audio signal to the FM stereo broadcasting apparatus is an analog signal, the sampling frequency of the A/D converter may be selected to be $f_s$. In recent years, the audio signal is often digitized, and the sampling frequency is selected to be 32 kHz, 44.1 kHz, 48 kHz and so on. On the other hand, the subcarrier frequency of the composite audio signal is 38 kHz and thus the ratio between the sampling frequency and the subcarrier frequency is not just an integer.

Accordingly, the sampling frequency of the digital audio input signal must be changed in the composite audio signal generator. The sampling frequency conversion is also necessary between the composite audio signal generator and the frequency modulator. In other words, in order to simplify the construction of the composite audio signal generator, it is desired that the operating sampling frequency be selected to be $2^N$ times as high as the subcarrier frequency (38 kHz).

On the other hand, it is also desired that the ratio between the (intermediate) carrier frequency (IF) of the frequency modulator 5 using the DDS circuit and the sampling frequency of the composite audio signal generator be an integer. However, the operating sampling frequency of the frequency modulator is ten-odd times as high as that of the composite audio signal generator, and thus the connection therebetween is difficult.

In order to construct the FM stereo broadcasting apparatus by combining various digital circuits which have different operating sampling frequencies, it is necessary that a device which can change the sampling frequency at an arbitrary conversion ratio be provided between the digital circuits. For this requirement, this invention employs a digital interpolator of a time variant coefficient FIR (Finite Impulse Response) filter. This interpolator, which is described in, for example, JP-A-4-332214, titled "high-speed interpolator", will be mentioned briefly.

Figure 11:
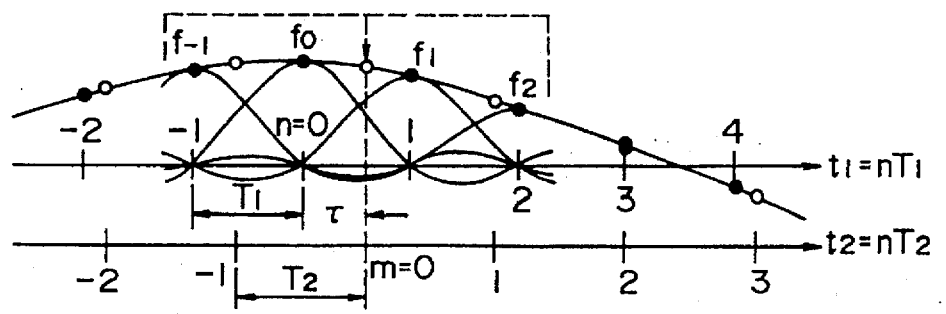
FIG. 11 is a waveform diagram to which reference is made in explaining the operation of the digital interpolator in the embodiment of the FM stereo broadcasting apparatus of the invention.

The operation of the digital interpolator will be described with reference to FIG. 11. The interpolator converts the input data indicated by the black small circles into output data indicated by white small circles.

According to the sampling theorem, the original time function f(t) can be derived from data sequence $f(nT_1)$ sampled at period $T_1$ by use of $\text{Sinc}(t) = \sin t/t$ as in the following equation (6).

$$f(t) = \Sigma f(nT_1) \text{Sinc}\{\pi(t-nT_1)/T_1\} = \Sigma f(nT_1) Sc(n, \tau) \quad (6)$$

$\tau = t/T_1$: fraction used when output time t is measured at period $T_1$

The equation (6) shows that when data value at time t is predicted by primary coupling of discrete data $f(nT_1)$, the coupling coefficient $Sc(n, \tau)$ is the function of t. Hereinafter, $Sc(n, \tau)$ is referred to as time variant coefficient). The time variant coefficient $Sc(n, \tau)$ is a function which takes 1 when $t=nT_1$ and 0 when $t=mT_1$ ($m \neq n$, m and n are integers). Various functions such as Sinc(t) in Eq. (6) and Lagrange's interpolation polynomial of Lagrange used in numerical analysis can be used therefor.

Also, the equation (6) shows that the interpolation value f(t), when approximated by a finite number of a data N, can be obtained as output of non-cyclic (FIR) filter having time variant coefficient $Sc(n, \tau)$. From this, it will be understood that the interpolation (or sampling frequency conversion) can be realized as hardware by a time variant coefficient filter. The parameters n, $\tau$ which determine the time variant coefficient $Sc(n, \tau)$ are expressed by data output time t given by sampling period $T_2$ of output data sequence as in the following equation (7).

$$t = nT_1 + \tau = mT_2 \quad (7)$$

Figure 12:
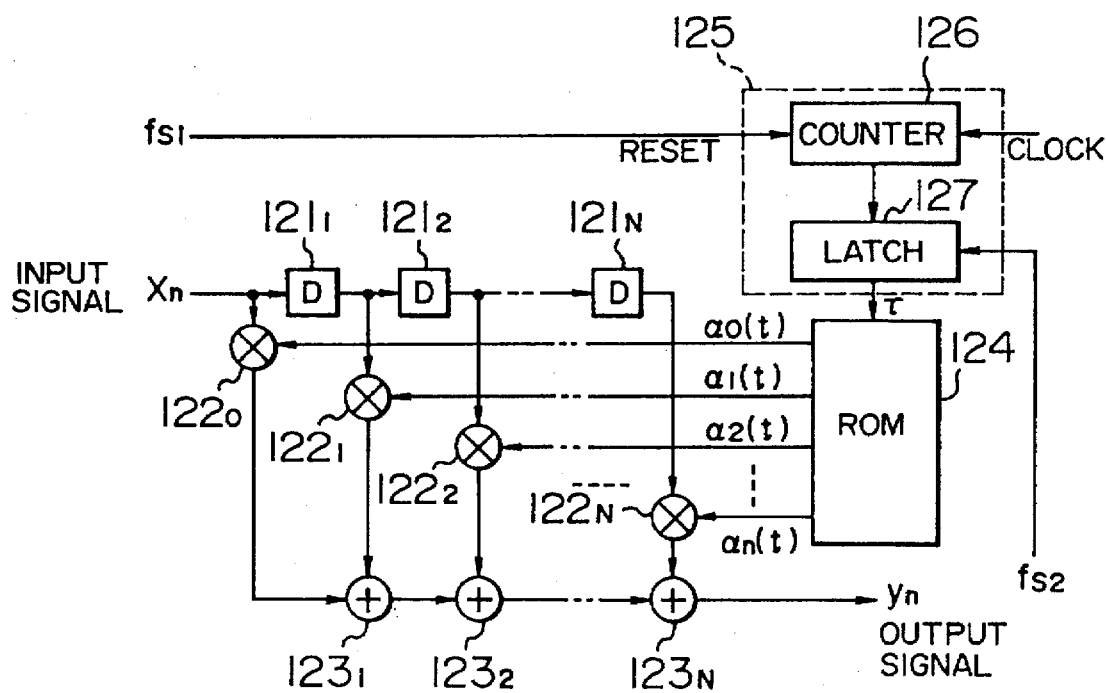
FIG. 12 is a block diagram of the digital interpolator in the embodiment of the FM stereo broadcasting apparatus of the invention.

FIG. 12 shows the arrangement of the whole digital interpolator, for example, digital interpolator 3A, 3B. Referring to FIG. 12, there are shown delay elements $121_1$, $121_2$, ..., $121_N$, coefficient multipliers $122_0$, $122_1$, $122_2$, ..., $122_N$, adder/subtracters $123_1$, $123_2$, ..., $123_N$ which constitute the FIR filter, a ROM 124, a timer 125, a counter 126 and a latch 127.

The timer 125 for obtaining the factor $\tau$ by which the interpolation time t in Eq. (7) is determined can be formed of the counter 126 which receives a clock pulse much faster than $T_1$, $T_2$ and which is reset at intervals of period $T_1$ of the sampling frequency $f_{s1}$ of the input signal to the interpolator, and the latch 127 which latches the count at intervals of the period $T_2$ of the sampling frequency $f_{s2}$ of the output side of the interpolator. The time variant coefficient $Sc(n, \tau)$, or the coefficient $(\alpha_0(t) - \alpha_n(t))$, of the multipliers $123_1$ to $123_N$ is previously written in the ROM 124 and read out from the ROM according to the factor $\tau$ (latch output) that has been obtained by the timer 125. This time variant coefficient $Sc(n, \tau)$ is supplied as the coefficient of the FIR filter to each multiplier $123_1$ to $123_N$, thus the interpolator being realized by the time variant coefficient filter.

The digital sampling frequency converter mentioned above can change the sampling frequency by itself and, when the conversion ratio is large, it can be combined with a low-pass filter for $2^N$-fold conversion and a digital interpolator to form a large-conversion-ratio (particularly the conversion ratio is not just an integer) interpolator. In other words, if 2.4-fold frequency conversion is made, two-fold frequency conversion is made by a low-pass filter and non-integer-fold, or 1.2-fold, frequency conversion is made by a digital interpolator, these low-pass filter and digital interpolator being connected in series.

Thus, in the frequency modulator 5 of the FM stereo broadcasting apparatus of the invention which has the feature (2) as mentioned above, if the constant $\omega_c T$ which gives the ratio m between the carrier frequency and the operating sampling frequency is selected to be larger than $2\pi \cdot (\frac{1}{2})$, the operating sampling frequency can be suppressed from being so large even under a higher carrier frequency.

The aliasing component can be eliminated by an analog band-pass filter as in the prior art. Although the amplitude attenuation and change of frequency characteristics are caused by the aperture effect of D/A converter, there is no problem because the frequency characteristics can be corrected beforehand by a filter.

While the frequency modulator of this invention is used for the FM stereo broadcasting apparatus as described above, it can be naturally used as an audio modulator for TV broadcasting or used for FM communication apparatus using a radio link or satellite link.

Since the operating sampling frequency of circuits is not necessary to be so large even if the (intermediate) carrier frequency (IF) is relatively high, the digital circuits and A/D converter may be slow in their operating speed, and it is possible to reduce power consumption and increase the precision with ease. Moreover, since the (intermediate) carrier frequency is high, frequency conversion may be made only once, and the number of analog circuits to be used can be decreased.

In the composite audio signal generator 2 which has the feature (1), since the operating sampling frequency ($f_{s2}$) of this generator is selected to be $2^N$ times as high as the subcarrier frequency ($f_{sub}$) and since the sampling frequency of the input signal is selected to be the same as the subcarrier frequency ($f_{sub}$) of the composite audio signal or the operating sampling frequency ($f_{s2}$), complicated circuits such as a balanced modulator and a subcarrier generator can be replaced by simple circuits, and thus the arrangement becomes very simple. A filter is necessary for balanced modulation, but the filters 41, 42, 45 for pre-emphasis of FM signal can substituted for it together with their functions, thus particularly the number of circuits used being not increased.

In addition, since the operating sampling frequency of apparatus is $2^N$ times as high as the subcarrier frequency, the frequency of the pilot signal has also the same relation, and in this case the pilot signal generator (indicated by 78 in FIG. 3) can be simplified in its construction. For example, in order to generate the pilot signal (19 kHz) from the sampling frequency 76 kHz, the equation of $$\cos(2\pi n 19/76) = \cos(n\pi/2) = 1, 0, -1, 0, 1, \quad (8)$$

is necessary, and thus very simple circuits of a polarity inverter and a change-over switch may be used.

Figure 13:
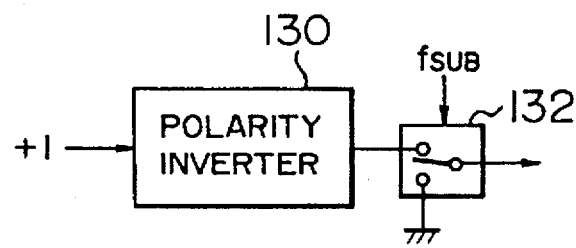
FIG. 13 is a block diagram of the pilot signal generator in the embodiment of the FM stereo broadcasting apparatus of the invention.

FIG. 13 is a block diagram of a pilot signal generator using a polarity inverter and change-over switch. An input signal of +1 is fed to a polarity inverter 130 and the output of the polarity inverter is supplied to the first input end of a change-over switch 132 having its second input end grounded, thus the pilot signal being produced from the output of the switch 132. The switch 132 is operated to switch between the first input and the second input at intervals of period $f_{sub}/2$. Thus, output signals of 1, 0, −1, 0, 1 ... are produced in turn with the period of sampling frequency. In place of this arrangement, a ROM may be used so that output signals of 1, 0, −1, 1 ... can be read out therefrom with the period of sampling frequency.

Moreover, the above simplification of digital processing is made by use of the relation between the operating sampling frequency and the signal frequency. The operating sampling frequencies of the respective circuit portions of the FM stereo broadcasting apparatus are different from each other, and thus sampling frequency conversion is necessary between the respective circuit portions. However, the digital interpolator having the feature (3) can be used to simplify the circuit arrangement, since the operating sampling frequency of the apparatus is not required to be so high.

The embodiment of the FM stereo broadcasting apparatus of the invention which has the above features (1) to (3) may have any one of these features.

The operation of the embodiment of FIG. 4 will be mentioned below.

Referring to FIG. 4, the stereo digital audio signal is separated into left and right signals L, R by the input circuit 1. The signals L, R are fed to the digital sampling frequency converters, or digital interpolators, 3A, 3B where their sampling frequency is changed into different sampling frequencies from that of the input digital audio signal. The output signals from the digital interpolators are supplied to the composite audio signal generator 2. The sampling frequency, $f_{s1}$ of the input digital audio signal may be 32 kHz, 44.1 kHz or 48 kHz as mentioned above. Considering the relation to the operating sampling frequencies of the following circuits, it is desirable that the operating sampling frequency $f_{s2}$ of the composite audio signal generator 2 be selected to be $2^N$ times as high as the subcarrier frequency ($f_{sub}$=38 kHz).

Since the ratio between the sampling frequency $f_{s1}$ and the operating sampling frequency $f_{s2}$ is not just an integer, the digital interpolators 3A, 3B (having the same construction as mentioned with reference to FIG. 12) for L-and R-audio signal are provided between the input circuit 1 and the composite audio signal generator 2.

The digital composite audio signal generator 2 produces the (L+R) and (L−R) audio signals from the L-and R-audio signal which is fed through the input circuit 1, and compounds those audio signals and the pilot signal to produce a composite audio signal. At this time, the audio signals are also pre-emphasized by the filters 41, 42, 45 provided within the generator 2. During this process, the sampling frequencies of the audio signals are converted into the sampling frequency $f_{s3}$ which is $2^N$ (N=1 in the example of FIG. 4) times as high as the subcarrier frequency $f_{sub}$. The composite stereo audio signal is multiplied by the maximum frequency deviation coefficient and then fed to the digital interpolator 3C.

The operating sampling frequency of the following frequency modulator 5 is determined with respect to the carrier frequency $f_c$ as describe above. As one example, a frequency of 10.75 MHz which is often used for an analog band-pass filter is selected as a carrier (intermediate) frequency. When constant $\omega_c T$32 0.75, the operating sampling frequency $f_{s5}$ of the frequency modulator is 10.7 MHz÷0.75=14.266 MHz. Since the ratio between 14.266 MHz and $f_{s3}$ is not just an integer, this sampling frequency conversion cannot be made by a normal filter. Thus, the digital interpolator 3C is used to change the sampling frequency into $f_{s4}$=14.266 MHz/8= 1.7833 MHz. The digital interpolator 3C is also formed by the time variant coefficient FIR filter.

The output from the digital interpolator 3C undergoes eight-fold interpolation in the low-pass filter 4 so that the sampling frequency of the output from the filter 4 is $f_{s5}$= 14.266 MHz. The composite audio signal of which the sampling frequency is $f_{s5}$ is fed to the DDS circuit 5 where it is added with $\omega_c T$=0.75 and integrated, thus a frequency-modulated signal of carrier frequency 10.7 MHz being produced.

The following low-pass filter 6 makes frequency correction for the aperture effect caused upon digital-to-analog conversion. The frequency-modulated signal has a band width of about 150 kHz and is a narrow-band signal since its fractional bandwidth is about 1.5% if the carrier frequency is 10.7 MHz. If the fractional bandwidth is within 5%, the correction for the aperture effect can also be relatively easily made. Since the aperture effect has a frequency characteristic in which the amplitude is attenuated in the high frequency region, the gain in the high frequency region is increased for the correction.

The operating sampling frequency of the low-pass filter 6 is $f_{s5}$=14.266 MHz and it acts like a high-pass filter to a signal of 10.7 MHz which is higher than Nyquist frequency. Thus, the frequency correction characteristic of the low-pass filter 6 is designed to decrease the gain as the frequency is increased from about 3.566 MHz (the aliasing component of 10.7 MHz with respect to 14.266 MHz).

The output from the low-pass filter is converted into an analog signal by the D/A converter 7. The analog signal is fed to the band-pass filter 8 of which the pass-band center frequency $f_c$ is 10 MHz, so that only a desired frequency-modulated signal is taken out. The frequency-modulated signal of intermediate frequency $f_c$=10.7 MHz is supplied to the frequency mixer 9.

The FM stereo broadcasting system in Japan employs a VHF band of 76 to 90 MHz. Thus, the carrier frequency $f_0$ of the final transmission output is required to be within this frequency band. The local carrier signal ($f_0$–$f_c$) from the local oscillator 10 is mixed with the (intermediate) frequency-modulated signal by the frequency mixer 9. The mixture signal is fed to the band-pass filter 11 where the output frequency-modulated signal $f_0$ is extracted. The extracted output signal is amplified in its power by the high-frequency power amplifier 12 and then transmitted as a broadcast wave.

In the embodiment of FIG. 4, since all the signal processing except the frequency conversion and high-frequency power amplification can be made by digital circuits, all the problems with the corresponding analog circuit arrangement can be avoided.

In addition, although the increase of carrier frequency in digital circuits inevitably causes the problem that the operating sampling frequency increases, the embodiment of the invention shown in FIG. 4 is able to relatively decrease the operating sampling frequency with the intermediate carrier frequency kept high. Thus, general-purpose components can be used without causing the D/A converter and digital circuit elements to operate at high speed.

Also, when the operating sampling frequencies are often required to change, of the digital circuits which constitute an FM stereo broadcasting apparatus, the digital interpolator can be used to simply make that frequency conversion as shown in the embodiment of the invention.

Moreover, since the FM stereo broadcasting system in Japan employs the VHF band of 76 to 90 MHz as mentioned above, the frequency-modulated signal to be transmitted must have a carrier frequency which is included within this frequency band. Thus, the analog frequency converter is used to change the frequency of the intermediate frequency-modulated signal. In the FM stereo broadcasting apparatus of the invention, since the intermediate carrier frequency is easily selected to be as high as 10-odd MHz, the frequency conversion is made only once so that the high-frequency circuit section of the FM stereo broadcasting apparatus can be simplified, leading to small size and low power consumption of apparatus.

FIG. 10 shows an example of the composite audio signal generator 2 of the FM stereo broadcasting apparatus of FIG. 4. In FIG. 10, there are shown low-pass filters 41, 42, 45, 48, an adder 43, a subtracter 44, a polarity inverter 46, and an adder 47. In FIG. 10, the operating sampling frequency of the low-pass filters 41, 42 is $2f_{sub}$, and the operating sampling frequencies of the low-pass filters 45 and 48 are $4f_{sub}$ and $8f_{sub}$, respectively.

The operation of the arrangement of FIG. 10 will be described below. The L-signal and R-signal of which the sampling frequency is $f_{sub}$ (=subcarrier frequency 38 kHz)

or $2f_{sub}$ are supplied to the low-pass filters 41 and 42, respectively, thereby pre-emphasized.

When the sampling frequency of the input signals is $f_{sub}$, the low-pass filters 41 and 42 also serve to convert the sampling frequency of input signals into a $2^N$-fold frequency. The outputs from the low-pass filters 41 and 42 are converted into an (L+R) signal and an (L−R) signal by the matrix circuit of adder 43 and subtracter 44.

The (L+R) signal is fed to the low-pass filter 45 of which the operating sampling frequency is $4f_{sub}$, so that the harmonic components at around $2f_{sub}$ are eliminated. The (L−R) signal is fed to the polarity inverter 46 where its polarity is inverted into positive or negative at the frequency of $f_{sub}$, thereby making balanced modulation (the circuit arrangement of FIG. 8). The (L+R) signal, the modulated (L−R) signal and the pilot signal of frequency $f_{sub}/2$ are compounded to produce a composite audio signal by the adder 47.

This composite audio signal is passed through the low-pass filter 48 of which the operating sampling frequency is selected to be $2^N$ times as high as the subcarrier frequency $f_{sub}$ (here, N=4, or $8f_{sub}$).

In the example of the composite audio signal generator shown in FIG. 10, complicated circuits such as the subcarrier generator and balanced modulator are not used since the input signals are digitally processed.

In this embodiment, the sampling frequencies $f_{s2}$ to $f_{s5}$ after the composite audio signal generator 2 are concerned with $2^N$, and thus the digital interpolator 3C may be omitted. However, when the sampling frequencies $f_{s2}$ to $f_{s5}$ are not concerned with $2^N$, the digital interpolator 3C is provided. This is true of the embodiment of FIG. 14.

FIG. 14 is a block diagram of the frequency modulator portion of another embodiment of the FM stereo broadcasting apparatus of the invention. The other portions of this embodiment are constructed in the same way as in the embodiment of FIG. 4. FIG. 15 is a signal spectrum diagram to which reference is made in explaining the operation of the frequency modulator portion. Referring to FIG. 14, the frequency modulator portion has an FM modulator 130, a low-pass filter, LPF 131, a D/A converter 132 and an analog band-pass filter 133. The constructions of these elements are respectively the same as those of the FM modulator 5, LPF 6, D/A converter 7 and analog band-pass filter 8. The operation of the frequency modulator portion will be mentioned with reference to FIG. 15.

The modulation signal is supplied to the digital FM modulator 130 where the frequency $f_1$ of a carrier signal is modulated by the modulation signal. The signal $f_1$ is smaller than the sampling frequency $f_{s5}$. The frequency-modulated wave, or FM wave of $f_1$ is supplied through the LPF 131 to the D/A converter 132 which then produces an analog FM signal. The output from the D/A converter includes an aliasing component of frequency components $nf_{s5} \pm f_1$ except the original signal component $f_1$ as well known. Here, n is a positive integer. When a desired component of, for example, $f_c = f_s + f_1$ is extracted by the analog band-pass filter 133 of which the pass band has the frequency $f_c = f_{s5} + f_1$ at its center, a frequency-modulated signal of which the carrier signal has the frequency $f_c$ can be obtained from the band-pass filter.

The frequency component at around $f_c = f_{s5} - f_1$ may be extracted by the BPF 133 of which the pass band has $f_c = f_{s5} - f_1$ at its center. In either case, the condition of $\frac{1}{2} \leq m \leq 1$ can be satisfied. Here, if n=0, the result becomes the same as in the embodiment of FIG. 4.

The embodiments of the FM stereo broadcasting apparatus of the invention have been described. According to this invention, since the operating sampling frequency of circuits is not necessary to so increase even under a relatively high (intermediate) carrier frequency, the digital processing circuits and D/A converter may be slow in their operating speed, power consumption can be reduced and the precision can be increased with ease.

The digital processing circuits can be simplified by selecting a ratio of $2^N$ between the operating sampling frequency of the signal being processed and the subcarrier frequency, and thus the apparatus can be small-sized.

In addition, since the (intermediate) carrier frequency is high, the frequency conversion can be made only once, and thus the number of analog circuits can be reduced. Also, since a digital interpolator is used for making necessary sampling frequency conversion at the connection between the digital circuits, the amount of hardware of the apparatus can be greatly reduced as compared with that in the conventional sampling frequency conversion using filters.

According to the FM stereo broadcasting apparatus of the invention, the signal processing portions ranging from the input circuit to which the stereo digital audio signal is applied up to the frequency modulator can be formed of digital processing circuits, and the frequency converter and high-frequency power amplifier can be formed of analog processing circuits. In addition, since the digital multiplier and carrier signal generator which are large in their circuit scale can be replaced by a simple DDS circuit, the circuit scale can be greatly reduced.

Moreover, since the ratio between the sampling frequencies used can be arbitrarily changed by use of a digital interpolator, the conversion ratio between the operating sampling frequencies of the digital circuits which constitute the FM stereo broadcasting apparatus is not limited, and thus the circuits are not necessary to operate at high speed, leading to low power consumption.

Furthermore, since the carrier frequency conversion may be made only once, the number of analog circuits can be minimized, and the apparatus can operate stably against various physical variations and omit initial adjustment and periodical maintenance. Also, since the circuit constants can be changed very easily, the FM stereo broadcasting apparatus can be practically used.

The TV broadcasting apparatus and communication equipment using the digital frequency modulator according to this invention can also achieve the same effect as above.

We claim:

1. An FM stereo broadcasting apparatus comprising:

input means for receiving a digital input signal having an L (left audio)-signal and an R (right audio)-signal and for separating the received digital input signal into the L-signal and the R-signal;

a first sampling frequency converting circuit, including first and second frequency converters, for converting a sampling frequency of each of the separated L-signal and the separated R-signal to one of a subcarrier frequency of a composite audio signal and a frequency of a first sampling signal;

a composite audio signal generator coupled to said first sampling frequency converting circuit, for generating the composite audio signal on the basis of a pilot signal, the L-signal and the R-signal;

a sampling signal generator coupled to said composite audio signal generator, for generating the first sampling signal for operating the composite audio signal generator, the first sampling signal having a frequency equal to $2^N$ times the subcarrier frequency; and a frequency modulator coupled to said composite audio signal generator for modulating the frequency of a carrier signal by the composite audio signal to produce a frequency-modulated signal, where N is an integer and N≧1.

2. An FM stereo broadcasting apparatus according to claim 1, wherein said sampling signal generator also generates a second sampling signal having a frequency for operating said frequency modulator.

3. An FM stereo broadcasting apparatus according to claim 2, further comprising a second sampling frequency converter for converting a sampling frequency of the composite audio signal to the second sampling frequency and supplying the frequency-converted composite audio signal to said frequency modulator.

4. An FM stereo broadcasting apparatus according to claim 2, wherein said frequency modulator comprises:

an added circuit for adding the composite audio signal to a constant-value signal equal to the ratio of the frequency of the carrier to the frequency of the second sampling signal;

an integrator circuit for integrating (accumulating) the sum value from said adder circuit; and a sine/cosine converter for converting the integrated value into either a sine or a cosine function thereof as the frequency-modulated signal.

5. An FM stereo broadcasting apparatus according to claim 2, wherein the ratio of the frequency of the carrier signal to the frequency of the second sampling signal is ½ or more.

6. An FM stereo broadcasting apparatus, comprising:

input means for receiving a digital input signal having an L (left audio)-signal and an R (right audio)-signal;

a first sampling frequency converter for converting a sampling frequency of the digital input signal to one of a subcarrier frequency of a composite audio signal and a frequency of a first sampling signal;

a composite audio signal generator coupled to said first sampling frequency converter, for generating the composite audio signal on the basis of a pilot signal, the L-signal and the R-signal;

a sampling signal generator coupled to said composite audio signal generator, for generating the first sampling signal for operating the composite audio signal generator, the first sampling signal having a frequency equal to $2^N$ times the subcarrier frequency;

a frequency modulator coupled to said composite audio generator for modulating the frequency of a carrier signal by the composite audio signal to produce a frequency-modulated signal;

a low-pass filter for receiving the frequency-modulated signal from said frequency modulator; and a digital-to-analog converter for converting the output from said low-pass filter into an analog signal, wherein:

N is an integer and N≧1 and frequency distortion due to the aperture effect of said digital-to-analog converter is corrected beforehand by said low-pass filter.

7. An FM stereo broadcasting apparatus, comprising:

input means for receiving a digital input signal having an L (left audio)-signal and an R (right audio)-signal;

a first sampling frequency converter for converting a sampling frequency of the digital input signal to one of a subcarrier frequency of a composite audio signal and a frequency of a first sampling signal;

a composite audio signal generator coupled to said first sampling frequency converter, for generating the composite audio signal on the basis of a pilot signal, the L-signal and the R-signal;

a sampling signal generator coupled to said composite audio signal generator, for generating the first sampling signal for operating the composite audio signal generator, the first sampling signal having a frequency equal to $2^N$ times the subcarrier frequency; and a frequency modulator coupled to said composite audio generator for modulating the frequency of a carrier signal by the composite audio signal to produce a frequency-modulated signal, wherein N is an integer and N≧, wherein said first sampling frequency converter converts the frequency of the digital input signal to the frequency of the first sampling signal, and wherein said composite audio signal generator comprises:

an adder circuit and a subtracter circuit for generating, respectively, a sum signal and a difference signal on the basis of the L-signal and the R-signal;

a polarity inverter for inverting the polarity of the difference signal with a period of $1/(2^{N-1} \times$ (the subcarrier frequency)); and a second adder circuit for adding the sum signal, the polarity-inverted difference signal, and the pilot signal to produce the composite audio signal.

8. An FM stereo broadcasting apparatus, comprising:

input means for receiving a digital input signal having an L (left audio)-signal and an R (right audio)-signal;

a first sampling frequency converter for converting a sampling frequency of the digital input signal to one of a subcarrier frequency of a composite audio signal and a frequency of a first sampling signal;

a composite audio signal generator coupled to said first sampling frequency converter, for generating the composite audio signal on the basis of a pilot signal, the L-signal and the R-signal;

a sampling signal generator coupled to said composite audio signal generator, for generating the first sampling signal for operating the composite audio signal generator, the first sampling signal having a frequency equal to $2^N$ times the subcarrier frequency; and a frequency modulator coupled to said composite audio generator for modulating the frequency of a carrier signal by the composite audio signal to produce a frequency-modulated signal, wherein N is an integer, N≧, and said first sampling frequency converter comprises:

a counter which is periodically reset by a sampling pulse signal having a frequency equal to the sampling frequency of the digital input signal and which counts a clock signal having a frequency greater than the sampling frequency of the input signal or the frequency of the first sampling signal and produces a count each time the first sampling signal is applied; and a time-variant coefficient FIR filter having a filter coefficient determined by the count from said counter, for converting the sampling frequency of the digital input signal sampled by a sampling pulse signal of the first sampling frequency into the frequency of a signal sampled at the first sampling frequency.

9. An FM stereo broadcasting apparatus according to claim 3, wherein each of said first and second sampling frequency converters comprises:

a counter which is periodically reset by a sampling pulse signal having a frequency equal to the sampling frequency of the signal applied to said sampling frequency converter, and which counts a clock signal having a frequency greater than the sampling frequency of the signal applied to said sampling frequency converter or the operating sampling frequency of a circuit on the output side of said sampling frequency converter and produces a count each time a sampling signal having the operating sampling frequency of the circuit on the output side of said sampling frequency converter is applied; and a time variant coefficient FIR filter having a filter coefficient determined by the count from said counter, for converting the sampling frequency of the input signal to said sampling frequency converter into the operating sampling frequency of the circuit on the output side of said sampling frequency converter.

10. An FM stereo broadcasting method, comprising the steps of:

(a) receiving a stereo digital audio input signal having an L (left audio)-signal and R (right audio)-signal;

(b) separating the received stereo digital audio input signal into the L-signal and the R-signal;

(c) converting a sampling frequency of each of the separated L-signal and the separated R-signal to one of a subcarrier frequency of a composite audio signal and a frequency of a first sampling signal, by applying the separated L-signal and the separated R-signal to a sampling frequency converter including first and second frequency converter circuits;

(d) generating the first sampling signal with a frequency equal to $2^N$ times the subcarrier frequency;

(e) generating the composite audio signal on the basis of a pilot signal, the L-signal and the R-signal of the converted digital input signal in synchronism with the first sampling signal; and (f) modulating the frequency of a carrier signal by the composite audio signal to produce a frequency-modulated signal, where N is an integer and $N \geq 1$.

11. An FM stereo broadcasting method according to claim 10, wherein step (d) includes generating a second sampling signal having a frequency for executing step (f).

12. An FM stereo broadcasting method according to claim 11, further comprising:

converting a sampling frequency of the composite audio signal to the second sampling frequency to produce the composite audio signal.

13. An FM stereo broadcasting method according to claim 11, wherein step (d) comprises:

adding the composite audio signal to a constant-value signal equal to the ratio between the frequency of the carrier to the frequency of the second sampling signal;

integrating (accumulating) the added value; and converting the integrated value into the sine or cosine function thereof to produce the frequency-modulated signal.

14. An FM stereo broadcasting method according to claim 11, wherein the ratio of the frequency of the carrier signal to the frequency of the second sampling signal is ½ or above.

15. An FM stereo broadcasting method, comprising the steps of:

(a) receiving a digital input signal having an L (left audio)-signal and R (right audio)-signal;

(b) converting a sampling frequency of the digital input signal to one of a subcarrier frequency of a composite audio signal and a frequency of a first sampling signal;

(c) generating the first sampling signal with a frequency equal to $2^N$ times the subcarrier frequency;

(d) generating the composite audio signal on the basis of a pilot signal, the L-signal and the R-signal of the converted digital input signal in synchronism with the first sampling signal;

(e) modulating the frequency of a carrier signal by the composite audio signal to produce a frequency-modulated signal, (f) supplying the frequency-modulated signal to a low-pass filter; and (g) applying the output from said low-pass filter to a digital-to-analog converter to convert said output into an analog signal, the frequency characteristic distortion due to the aperture effect of said digital-to-analog converter having been corrected beforehand by said low-pass filter, where N is an integer and $N \geq 1$.

16. An FM stereo broadcasting method, comprising the steps of:

(a) receiving a digital input signal having an L (left audio)-signal and R (right audio)-signal;

(b) converting a sampling frequency of the digital input signal to one of a subcarrier frequency of a composite audio signal and a frequency of a first sampling signal, including converting the frequency of the input signal to the frequency of the first sampling signal;

(c) generating the first sampling signal with a sampling frequency equal to $2^N$ times the subcarrier frequency;

(d) generating a sum signal and a difference signal on the basis of the L-signal and the R-signal;

(e) inverting the polarity of the difference signal with a period of $1/(2^{N-1} \times$ (the subcarrier frequency));

(f) adding the sum signal, the polarity-inverted difference signal, and a pilot signal to produce the composite audio signal, in synchronism with the first sampling signal; and (g) modulating the frequency of a carrier signal by the composite audio signal to produce a frequency-modulated signal, where N is an integer and $N \geq 1$.

* * * * *